United States Patent
Samardzic et al.

(10) Patent No.: US 9,442,350 B2
(45) Date of Patent: Sep. 13, 2016

(54) HIDDEN CAMERA ASSEMBLY WITH MICROPROCESSOR CONTROL

(71) Applicant: FORD GLOBAL TECHNOLOGIES, LLC, Dearborn, MI (US)

(72) Inventors: Igor Samardzic, Tecumseh (CA); David Lee Jarvis, Madison Heights, MI (US); Jeffrey Mayville, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/560,050

(22) Filed: Dec. 4, 2014

(65) Prior Publication Data
US 2016/0161831 A1 Jun. 9, 2016

(51) Int. Cl.
*G03B 17/00* (2006.01)
*H04N 7/18* (2006.01)
*G03B 17/56* (2006.01)
*G03B 29/00* (2006.01)

(52) U.S. Cl.
CPC ............ *G03B 17/561* (2013.01); *G03B 29/00* (2013.01)

(58) Field of Classification Search
USPC .......................... 396/427, 433; 348/143, 151
See application file for complete search history.

(56) References Cited

U.S. PATENT DOCUMENTS

| | | | | |
|---|---|---|---|---|
| 7,564,373 | B2 * | 7/2009 | Platt ....................... | B64D 15/20 244/134 F |
| 2005/0052560 | A1 * | 3/2005 | Murakami ......... | H04N 5/23212 348/335 |
| 2009/0002491 | A1 * | 1/2009 | Haler ...................... | B60R 1/12 348/148 |
| 2013/0155238 | A1 * | 6/2013 | Scudder .................. | B60R 11/04 348/148 |
| 2013/0235204 | A1 | 9/2013 | Buschmann | |
| 2013/0294758 | A1 | 11/2013 | Barthel | |
| 2014/0043528 | A1 | 2/2014 | Barthel | |
| 2014/0197649 | A1 | 7/2014 | Hansen | |
| 2015/0288857 | A1 * | 10/2015 | Fay ...................... | H04N 5/2251 348/36 |

FOREIGN PATENT DOCUMENTS

DE 102004039450 A1 3/2006

OTHER PUBLICATIONS

"Volkswagen rotating rearview camera with VW logo, Back up canners CC/Golf/Phaeton"; located on Ebay.com; printed on Sep. 25, 2014, 23 pages.
English machine translation of DE102004039450.

* cited by examiner

*Primary Examiner* — Minh Phan
(74) *Attorney, Agent, or Firm* — Jason Rogers; King & Schickli, PLLC (57) ABSTRACT

A hidden camera system for a vehicle includes a cover, a camera, a pulse width drive motor, a linkage connecting the drive motor to the cover and the camera and a control system. The control system modulates output of the drive motor and electronically monitors operation of the hidden camera assembly as the camera is displaced between a hidden or home position and a fully deployed position.

8 Claims, 13 Drawing Sheets

HIDDEN CAMERA ASSEMBLY WITH MICROPROCESSOR CONTROL

TECHNICAL FIELD

This document relates generally to camera systems for motor vehicles and, more particularly, to a hidden camera assembly with microprocessor control and a pulse width modulating drive motor for maximum operating efficiency and overall performance.

BACKGROUND

It is known in the art to provide a camera assembly for a vehicle wherein the camera is normally concealed behind a cover, such as a vehicle badge or emblem. When activated, the cover is opened and the camera is deployed to provide a desired field of view useful in allowing an operator to better operate a vehicle. Such a camera assembly is disclosed, for example, in U.S. patent application Ser. No. 14/467,841, filed on Aug. 25, 2014, entitled "Hidden Camera System for vehicle", the full disclosure of which is incorporated herein by reference.

This document relates to a hidden camera assembly incorporating a control system with microprocessor control and a pulse width modulating drive motor. That control system allows electronic monitoring of all camera movements between a hidden position and a fully deployed position. Such a control system allows for a number of significant benefits and advantages including but not necessarily limited to: (a) differentiation of opening and closing speeds; (b) slower closing speeds allowing more effective obstacle detection and anti-pinch control as well as a soft close followed by a power bump for better sealing of the camera cover; (c) faster opening speeds minimizing system boot up delays upon system actuation; and (d) increased power to drive system to break a closed cover free of any ice holding that cover in a closed position.

SUMMARY

In accordance with the purposes and benefits described herein, a hidden camera assembly is provided for a vehicle. That hidden camera assembly comprises a cover, a camera, a pulse width modulating drive motor, a linkage connecting the drive motor to the cover and the camera and a control system. The control system modulates output of the drive motor and electronically monitors operation of the hidden camera assembly as it is deployed from and returned to its home position.

More specifically, the control system provides a first mode of operation wherein the camera is deployed in a first time frame $F_1$, a second mode of operation wherein the camera is hidden in a second time frame $F_2$ where $F_1<F_2$. Further, the control system provides a third mode of operation wherein power to the drive motor is increased for a limited period of time to break the cover free of any ice holding the cover in a closed position.

The control system includes at least one position marker carried on the linkage and at least one sensor for detecting that position marker. Further the control system includes a controller operating the drive motor in response to input data from the sensor.

In one possible embodiment the position marker is a magnetic element. In one possible embodiment the sensor is a hall sensing element. In one possible embodiment the controller is a computing device such as a microprocessor controller or electronic control unit (ECU).

In one possible embodiment, the control system includes a circuit board and the at least one hall sensing element and a computing device are carried on that circuit board. In one possible embodiment, the linkage includes a transmission including at least one gear and the magnetic element is carried on that one gear. In one possible embodiment the linkage includes a transmission, a crank arm, a first link, a second link, a cover support bracket and a camera mounting bracket.

In accordance with an additional aspect, a method is provided for operating a hidden camera assembly for a motor vehicle. That method may be broadly described as comprising the steps of displacing a camera from a hidden position to a fully deployed position in a first time frame $F_1$ and displacing the camera from the fully deployed position to the hidden position in a second time frame $F_2$ where $F_1<F_2$. In addition the method may include the step of reducing the speed of the camera movement as the camera approaches the fully deployed position. Further the method may include reducing the speed of camera movement as the camera approaches the hidden position.

In one possible embodiment, the method includes (a) closing a cover against a fascia of a motor vehicle as the camera is displaced into the hidden position, (b) detecting contact of the cover with a seal on the fascia and (c) increasing power to a drive motor to seal the cover against the fascia after initial contact.

In one possible embodiment, the method includes monitoring displacement of the camera and the cover of the camera assembly as the camera is displaced between the hidden position and the fully deployed position. Further the method includes increasing power to the drive motor if the camera is not displaced from the hidden position toward the fully deployed position within a predetermined time frame so as to break the cover free of any ice holding the cover in a closed position.

Still further, the method may include the step of increasing the power multiple times if necessary in order to break the cover free of the ice.

In the following description, there are shown and described several preferred embodiments of the camera system. As it should be realized, the camera system is capable of other, different embodiments and its several details are capable of modification in various, obvious aspects all without departing from the camera system as set forth and described in the following claims. Accordingly, the drawings and descriptions should be regarded as illustrative in nature and not as restrictive.

BRIEF DESCRIPTION OF THE DRAWINGS

The accompanying drawings incorporated herein and forming a part of the specification, illustrate several aspects of the camera system and together with the description serve to explain certain principles thereof. In the drawings.

Reference will now be made in detail to the present preferred embodiment of the camera system, examples of which are illustrated in the accompanying drawings.

DETAILED DESCRIPTION

Figure 1:
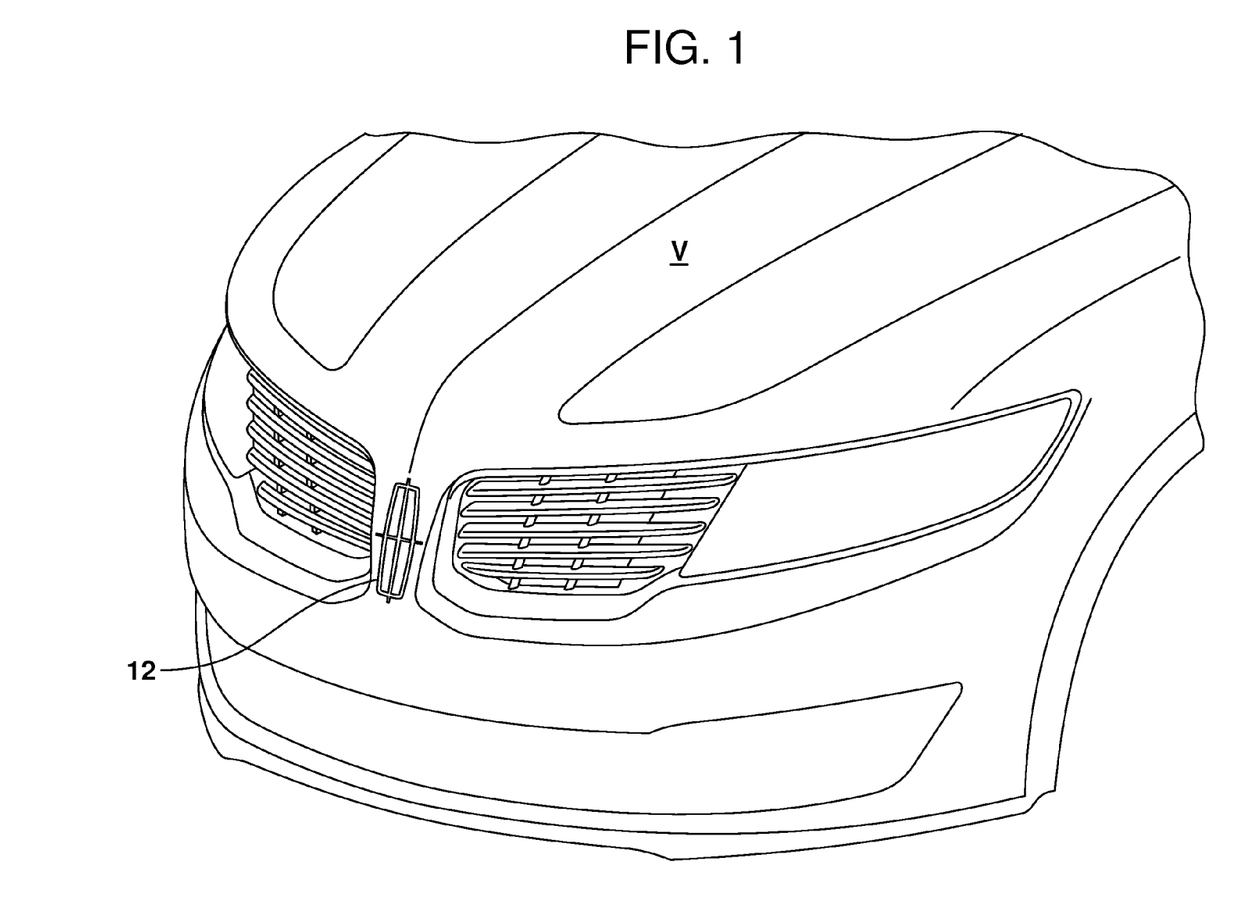
FIG. 1 is a front elevational view of a vehicle equipped with the current camera system which is shown in a retracted or closed position so that the camera is hidden from view by the manufacturer emblem or cover provided on the vehicle.
Figure 2:
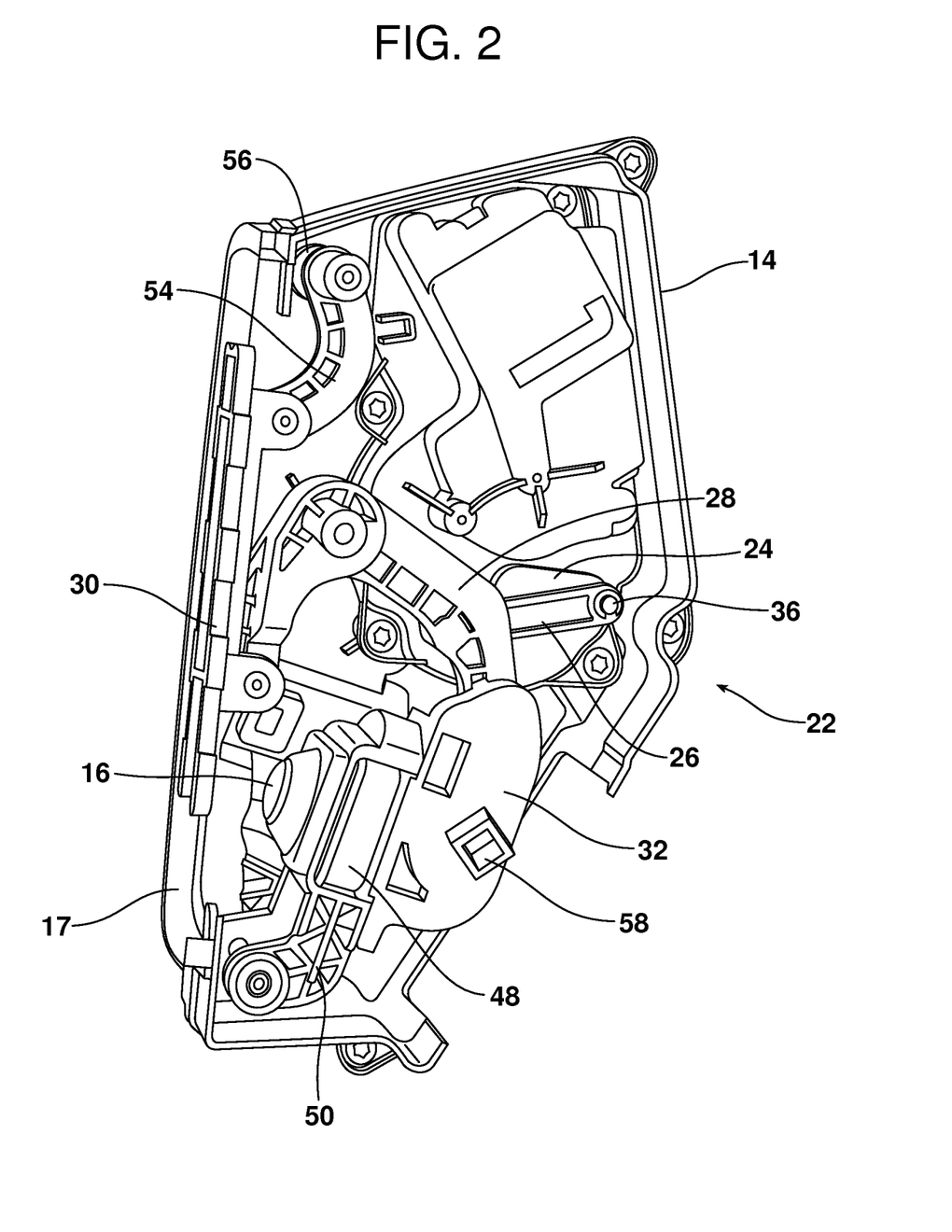
FIG. 2 is a first detailed, left side fragmentary view of the camera system in a retracted position.
Figure 3:
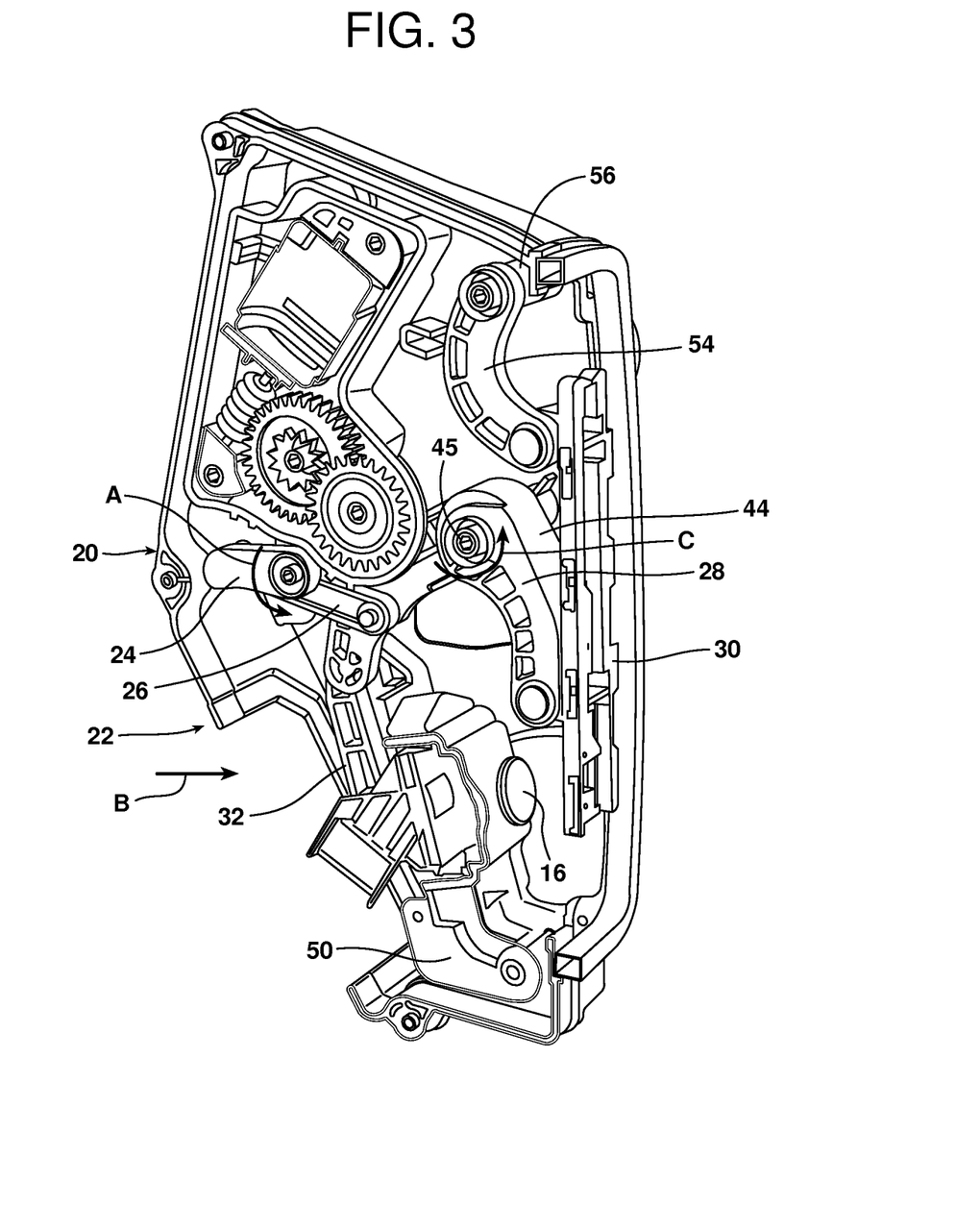
FIG. 3 is a second detailed, right side fragmentary view of the camera system in a retracted position.

Reference is now made to FIG. 1 illustrating a vehicle V equipped with a hidden camera assembly 10 which is concealed behind the cover 12 which, in the illustrated embodiment, is formed by the manufacturer emblem. As illustrated in FIGS. 2 and 3, the hidden camera assembly 10 includes a housing 14 that holds a camera 16, a pulse width modulating drive motor 18 and a linkage 22, including an associated gear transmission 20, connecting the drive motor to the cover 12 and the camera 16. A gasket 17 is provided around the front opening 19 of the housing 14 and seals the front of the housing when the cover 12 is closed.

As illustrated, in addition to the gear transmission 10, the linkage 22 includes a crank arm 24, a first link 26, a second link 28, a cover support bracket 30 on which the cover 12 is mounted, and a camera mounting bracket 32. More specifically, the crank arm 24 is connected to the gear transmission 20 by a rotating driveshaft 34. The opposite end of the crank arm 24 is pivotally connected to the first link 26 by the pivot pin 36. The second end of the first link 26 is connected to the second link 28 by the pivot pin 38. The first end of the second link 28 is connected to the cover support bracket 30 by a pivot pin 40. The second end of the second link 28 is connected to the camera mounting bracket 32 by a cam or roller 42 that is received and moves in a track 43 provided on the camera mounting bracket.

Figure 7:
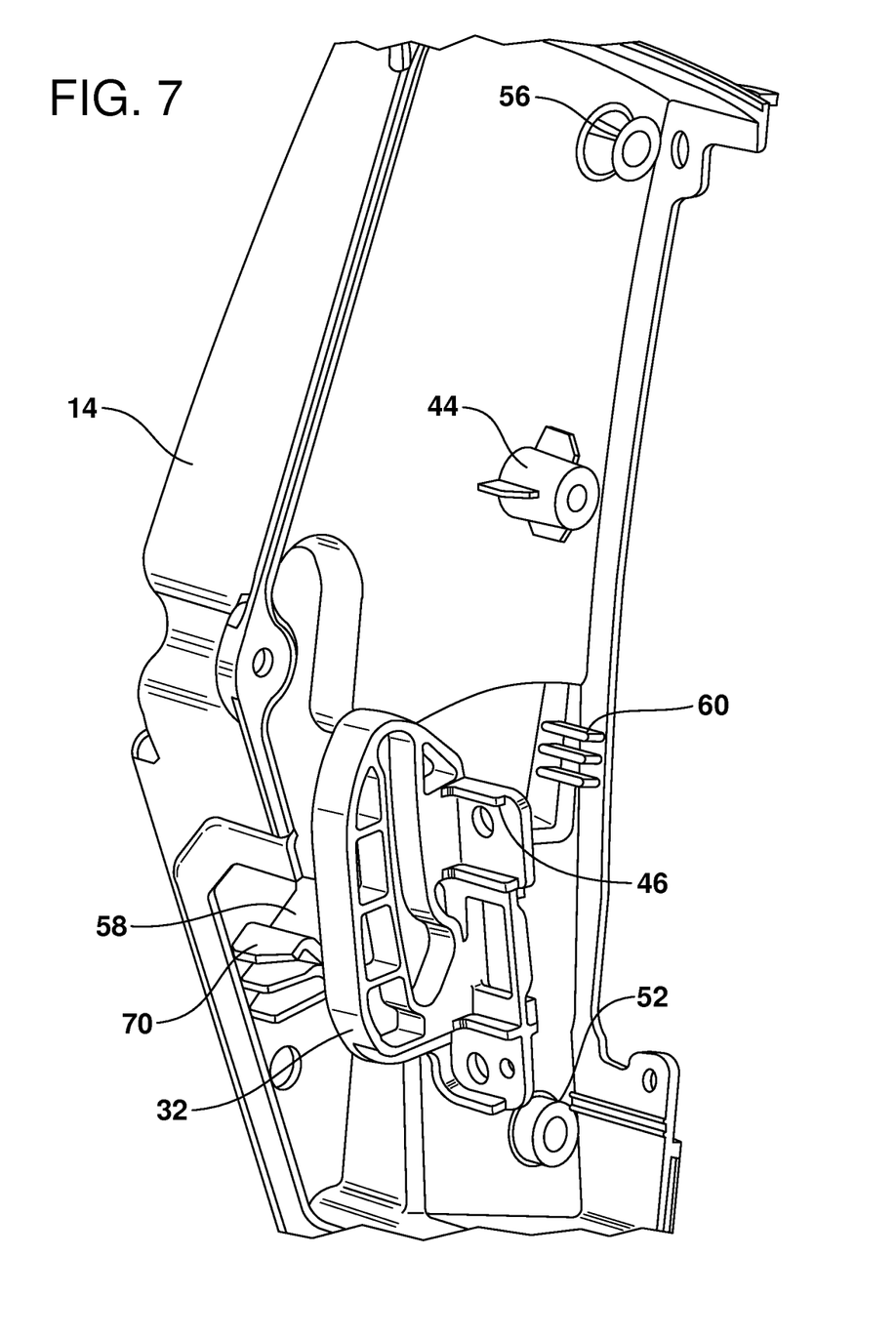
FIG. 7 is a detailed perspective view of the camera link with the abutment on the camera link engaging the second stop when the camera is in the fully retracted position and the cover is closed over the camera.

As should be further appreciated, the second link 28 is pivotally mounted at a first point to the housing 14 by a pivot pin 45 received in a boss 44 (see also FIG. 7). The pivot pin 38 connecting the first and second links 26, 28 is provided at a second point on the link 28 between the first point and the second end. In the illustrated embodiment, the second link 28 is substantially c-shaped.

The camera mounting bracket 32 includes flanges 46 and other related structures to engage the housing 48 of the camera 16 and securely hold the camera in position. The camera mounting bracket 32 is pivotally connected to the housing 14 by means of a first pivoting support arm 50. More specifically, the support arm 50 is pivotally supported on the housing 14 by means of the boss 52. The cover support bracket 30 (and, therefore, the cover 12 supported thereon) is pivotally mounted to the housing 14 by means of a second pivoting support arm 54. More specifically, the second support arm 54 is pivotally mounted to the housing 14 on the boss 56.

Figure 8:
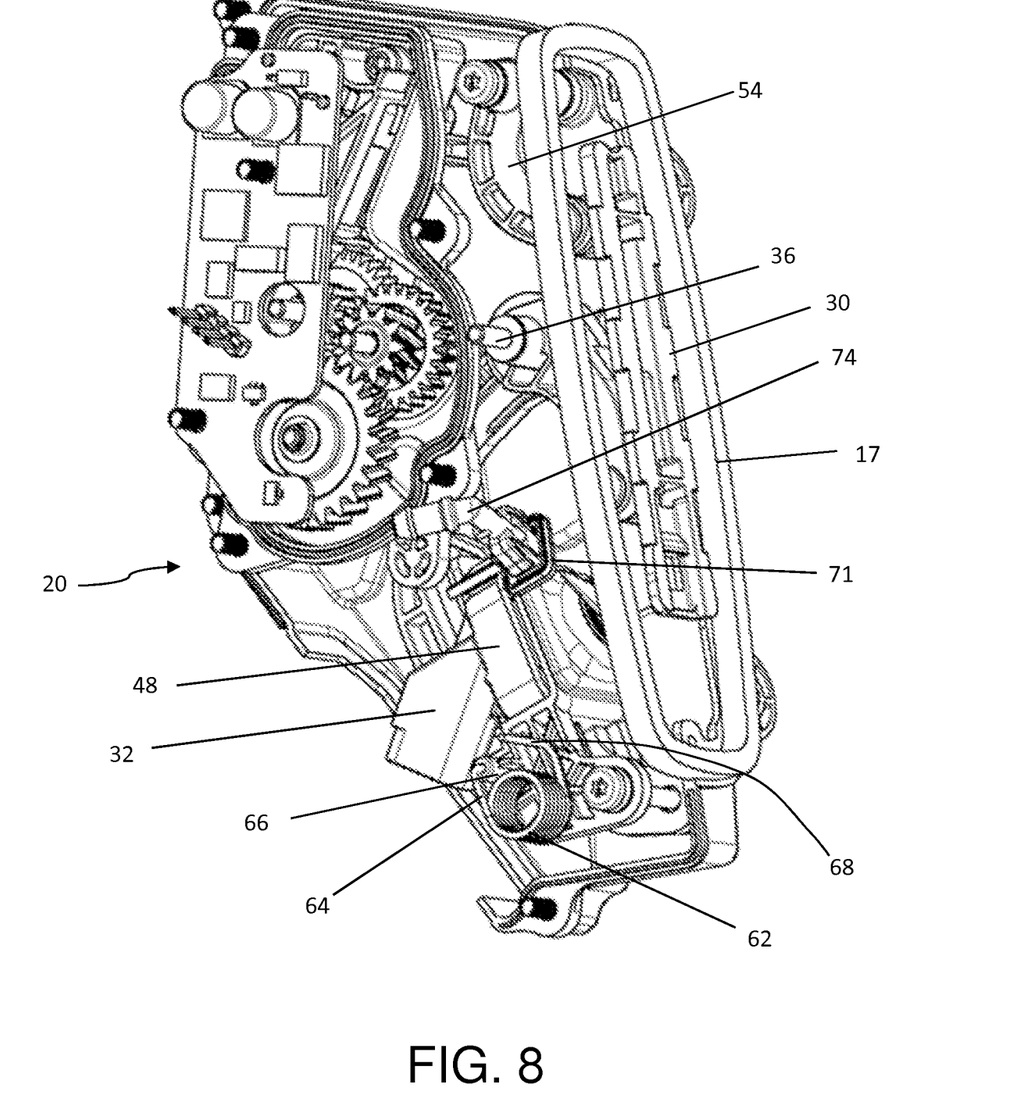
FIG. 8 is a cross-sectional view illustrating the biasing element or torsion spring that is connected to the support arm for the camera.

FIGS. 2 and 3 illustrate the hidden camera assembly 10 with the camera 16 in the fully retracted position and the camera hidden from view by the cover (deleted from figure for clarity). When activated, the camera 16 is displaced to a fully deployed position illustrated in FIGS. 4 and 5. More specifically, the drive motor 18 operates through the gear transmission 20 and the driveshaft 34 to turn the crank arm 24 in the direction of action arrow A. This causes the first link 26 to translate in the direction of action arrow B so as to pivot the second link 28 about the boss 44 in the direction of action arrow C. This simultaneously causes the cover 12 to pivot open about the boss 56 and the camera 16 to pivotally deploy about the boss 52. An abutment 58, projecting from the side of the camera mounting bracket 32 engages a stop 60 on the housing 14 when the camera 16 and cover 12 are both in the fully deployed position. Here it should be appreciated that a biasing element, in the form of a torsion spring 62 received around the boss 52, biases the camera 16 toward the fully deployed position. See FIG. 8. This ensures that the camera 16 is repeatedly fully deployed into the same position during each deployment. More specifically, the torsion spring 62 has a first end 64 secured in a socket 66 to the housing 14 and a second end 68 engaging the camera mounting bracket 32.

When it is desired to retract the camera 16, the drive motor 18 is driven in the opposite direction. This drives the crank arm 24 in the direction opposite to action arrow A which in turn causes the drive link 26 to translate in a direction opposite to action arrow B. As a result, the second link 28 pivots in a direction opposite to action arrow C causing the camera 16 to be retracted while the cover 12 is closed. When the camera 16 is fully retracted and the cover 12 is fully closed, the abutment 58 engages a second stop 70 formed on the housing 14. See FIG. 7.

Figure 9:
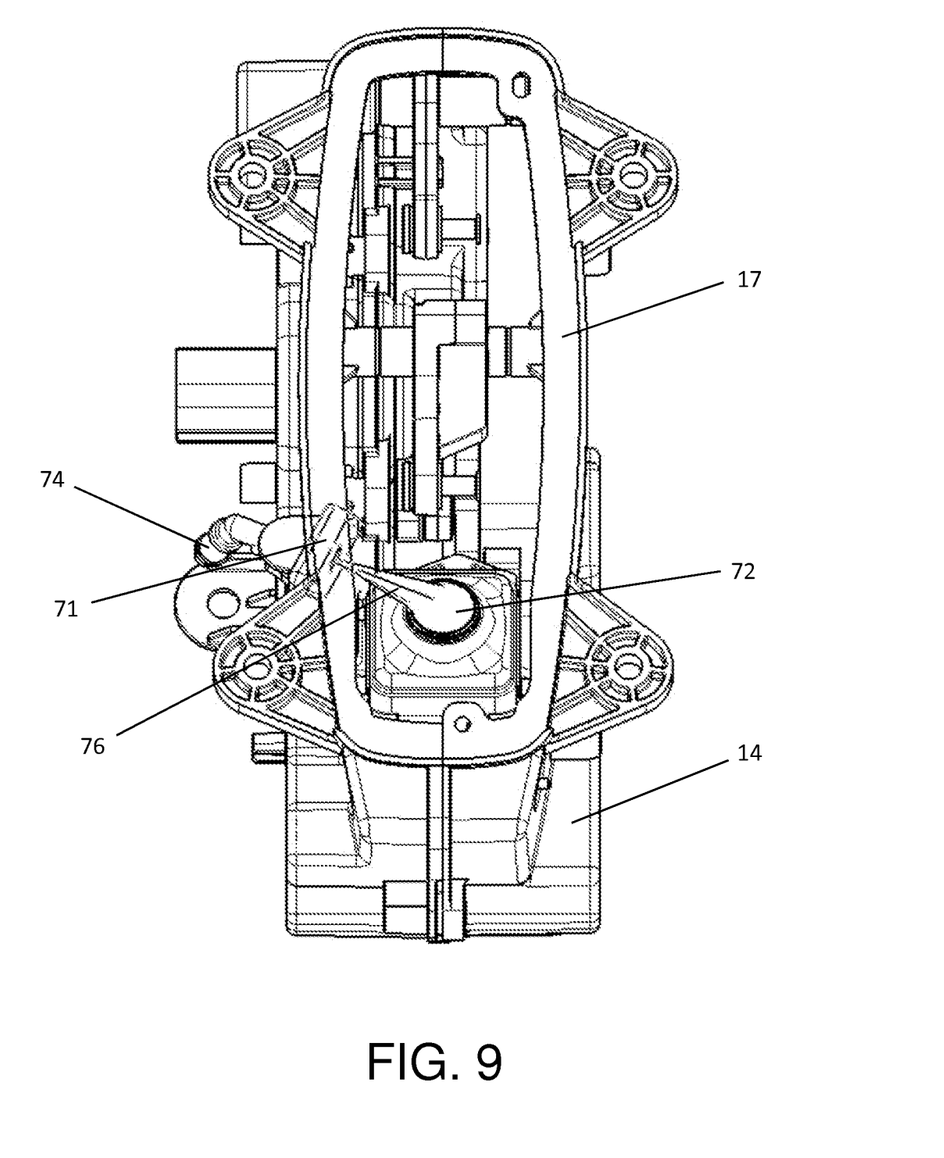
FIG. 9 is a detailed front elevational view illustrating the camera washing system.

As illustrated in FIG. 9, the hidden camera assembly 10 may also include a nozzle jet 71 for cleaning the lens or cover window 72 of the camera 16. More specifically, during each cleaning cycle cleaning fluid is fed by a pump (not shown) to the nozzle jet 71 through the delivery line 74 and is expelled in a washing stream 76 across the lens or cover window 72. Such a cleaning cycle may be initiated from inside the vehicle each time the vehicle operator engages the wiper washer to clean the windshield.

Figure 10:
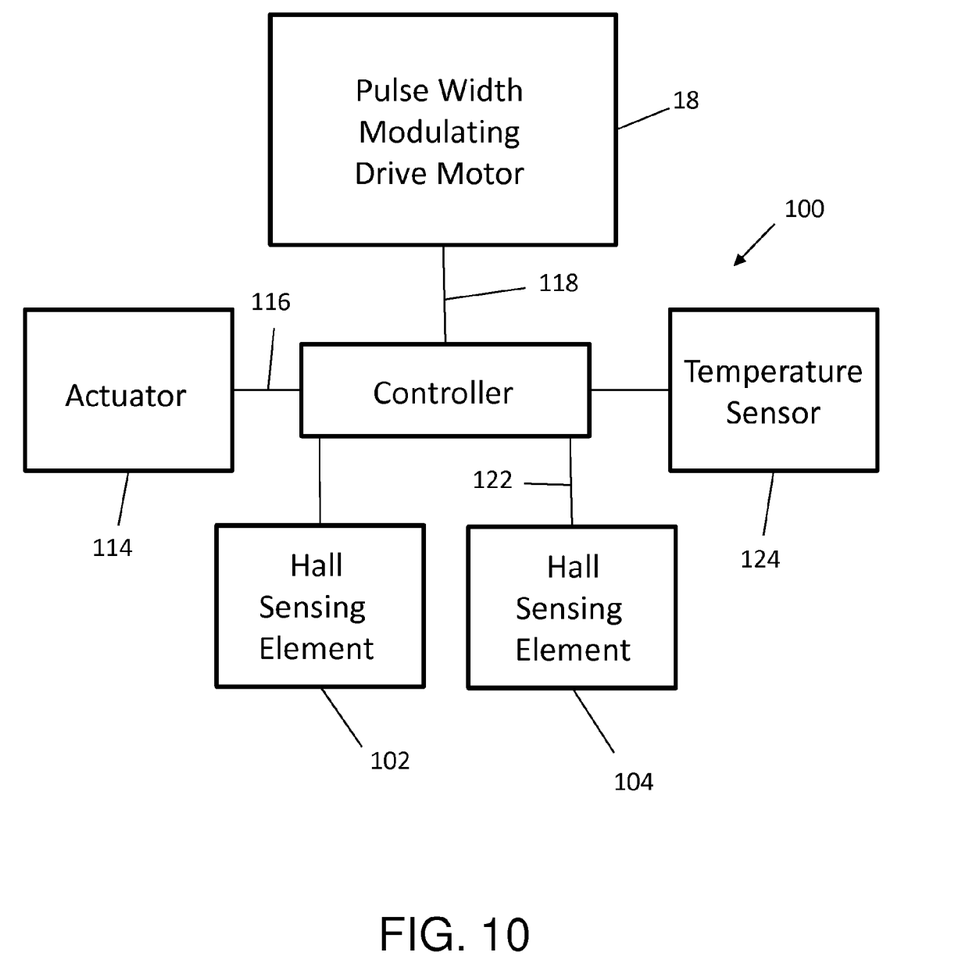
FIG. 10 is a schematic block diagram of the control system for the hidden camera assembly.

Reference is now made to FIG. 10 which is a schematic block diagram illustrating the control system 100 that modulates output of the drive motor 18 and electronically monitors the displacement of the camera 16 and cover 12 as they move between the home and deployed positions. That control system 100 includes two hall sensing elements 102, 104 mounted on the printed circuit 106 (see also FIGS. 5 and 11a-11c) and a controller 108 in the form of a computing device such as a dedicated microprocessor or ECU. Further, the system 100 includes a position marker in the form of a magnetic element 110 carried on one of the drive gear 112 of the gear transmission 20. The control system 100 functions to provide a number of operating benefits and advantages which will become clear in the following description of its method of operation.

Figure 4:
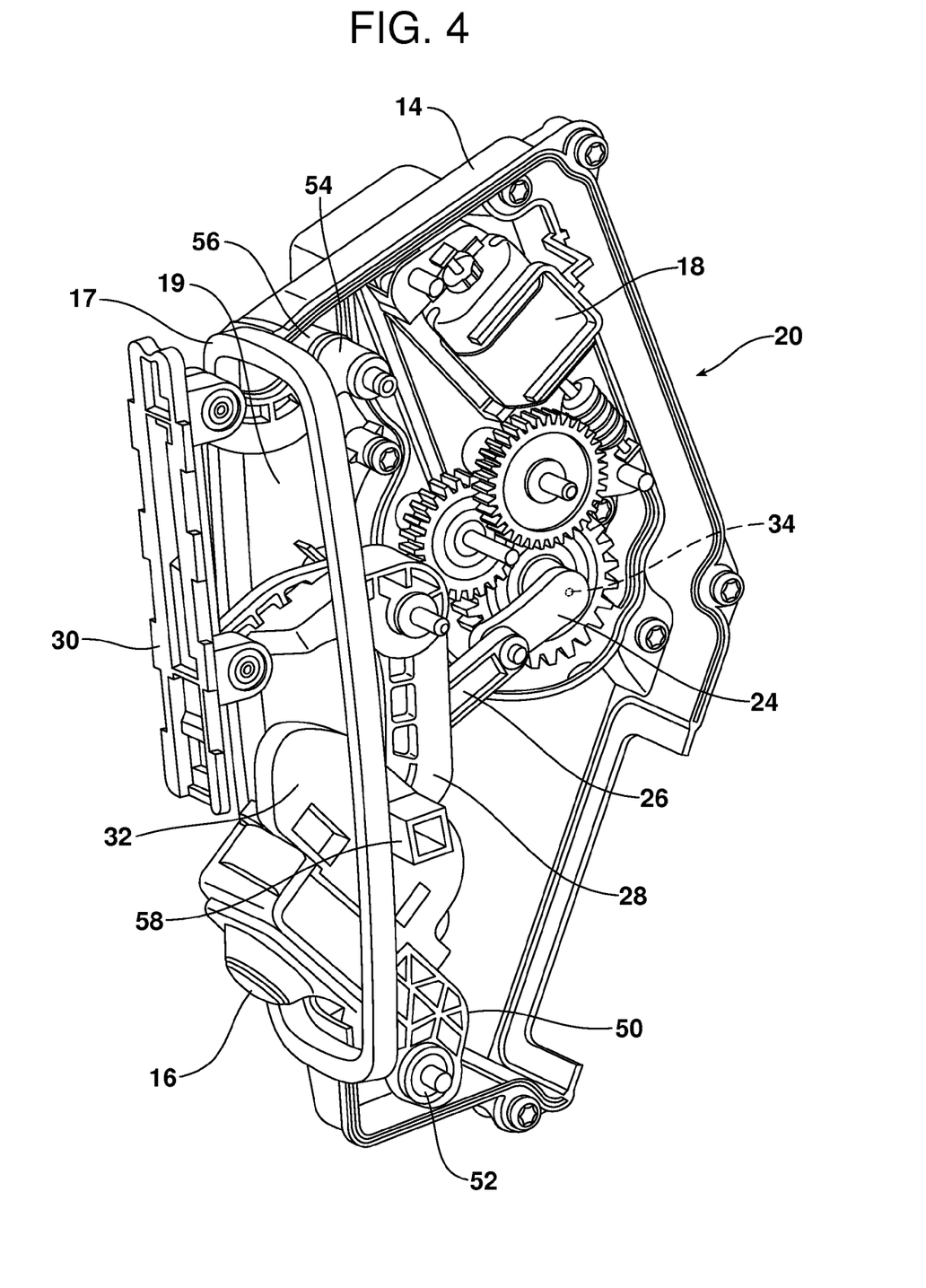
FIG. 4 is a first detailed, left side fragmentary view of the camera system in the fully deployed position.
Figure 5:
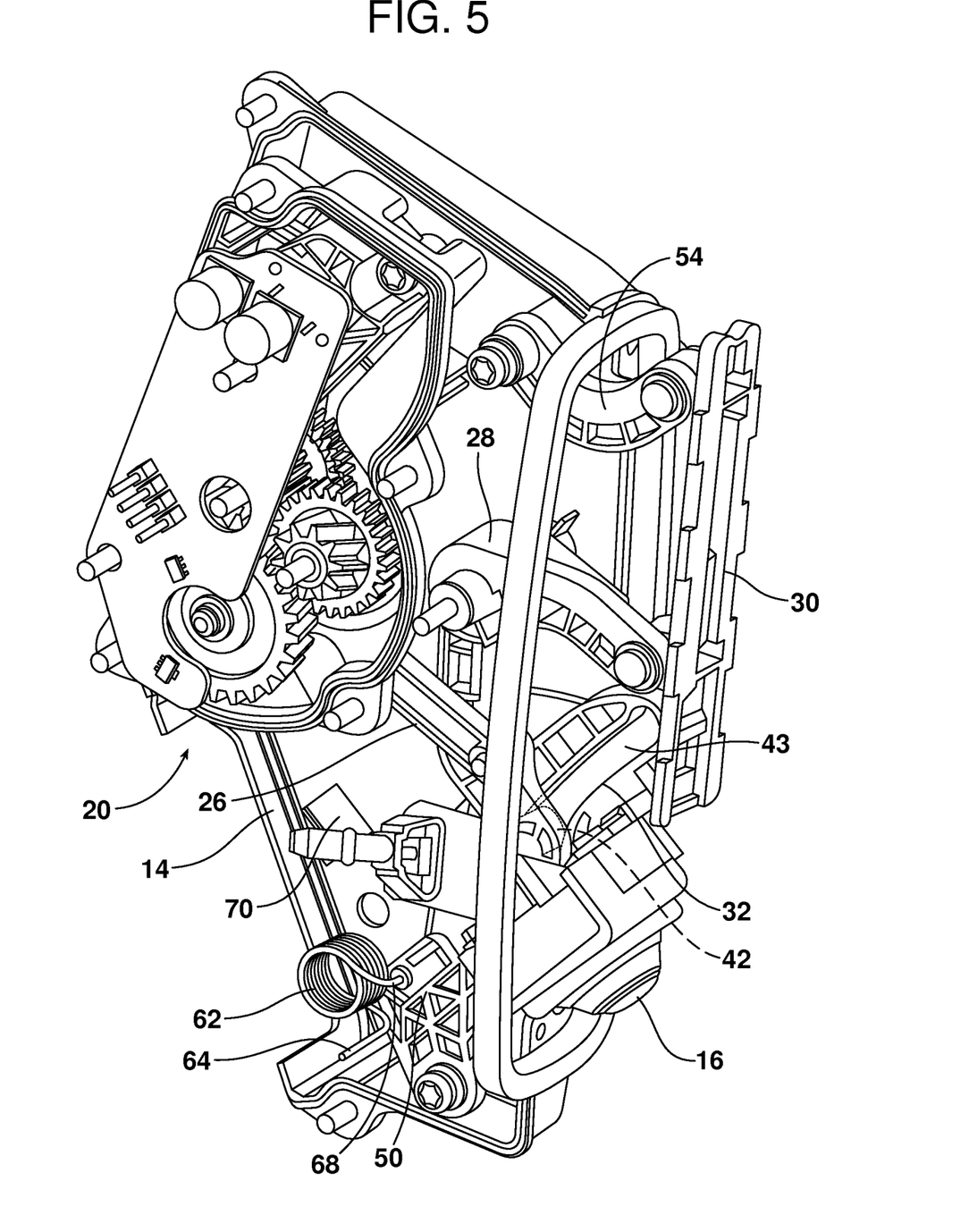
FIG. 5 is a second detailed, right side fragmentary view of the camera system in the fully deployed position.
Figure 6:
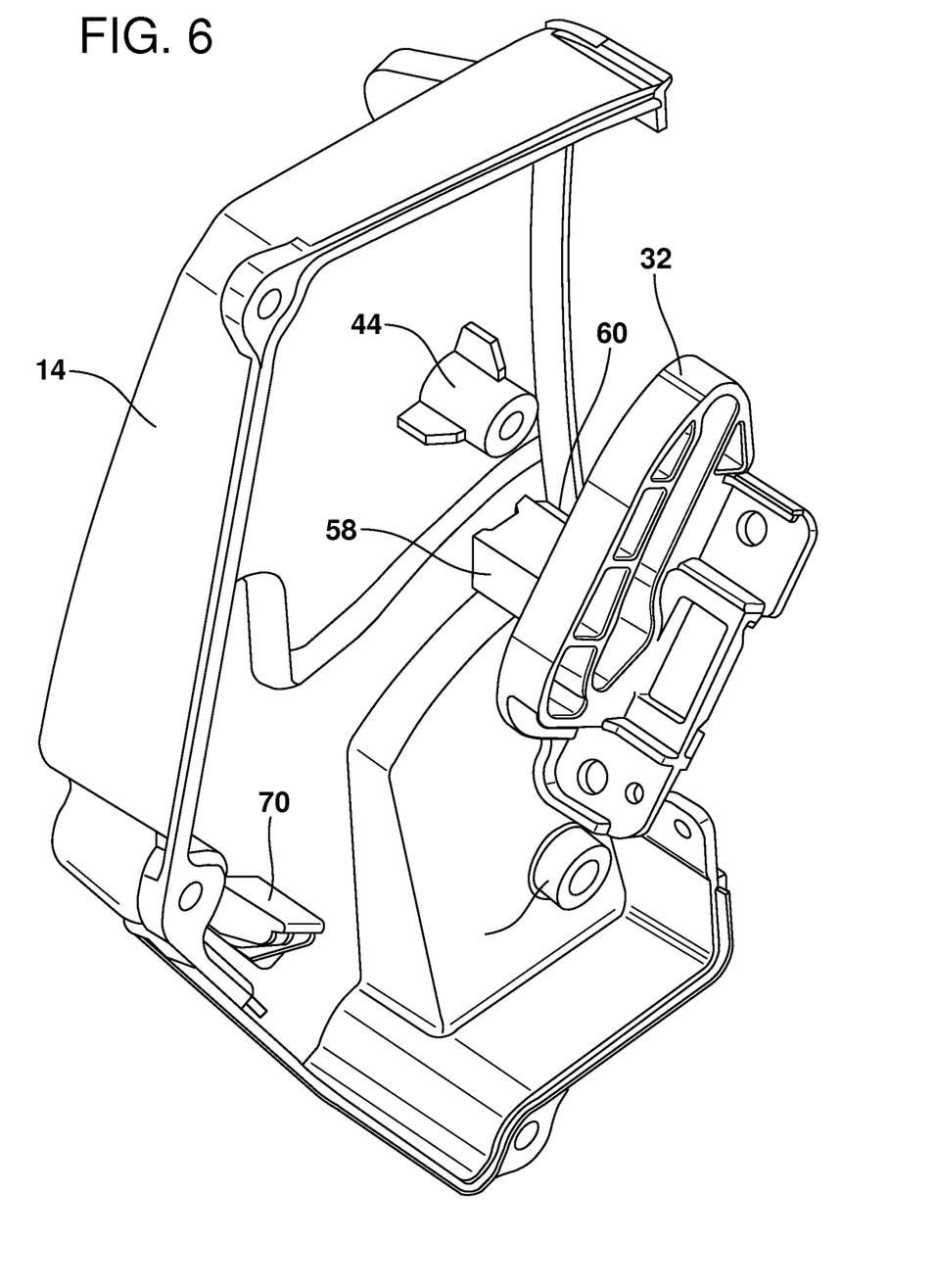
FIG. 6 is a detailed perspective view of the camera link with the abutment provided on the camera link engaging a first stop when the camera is in the fully deployed position.
Figure 11A:
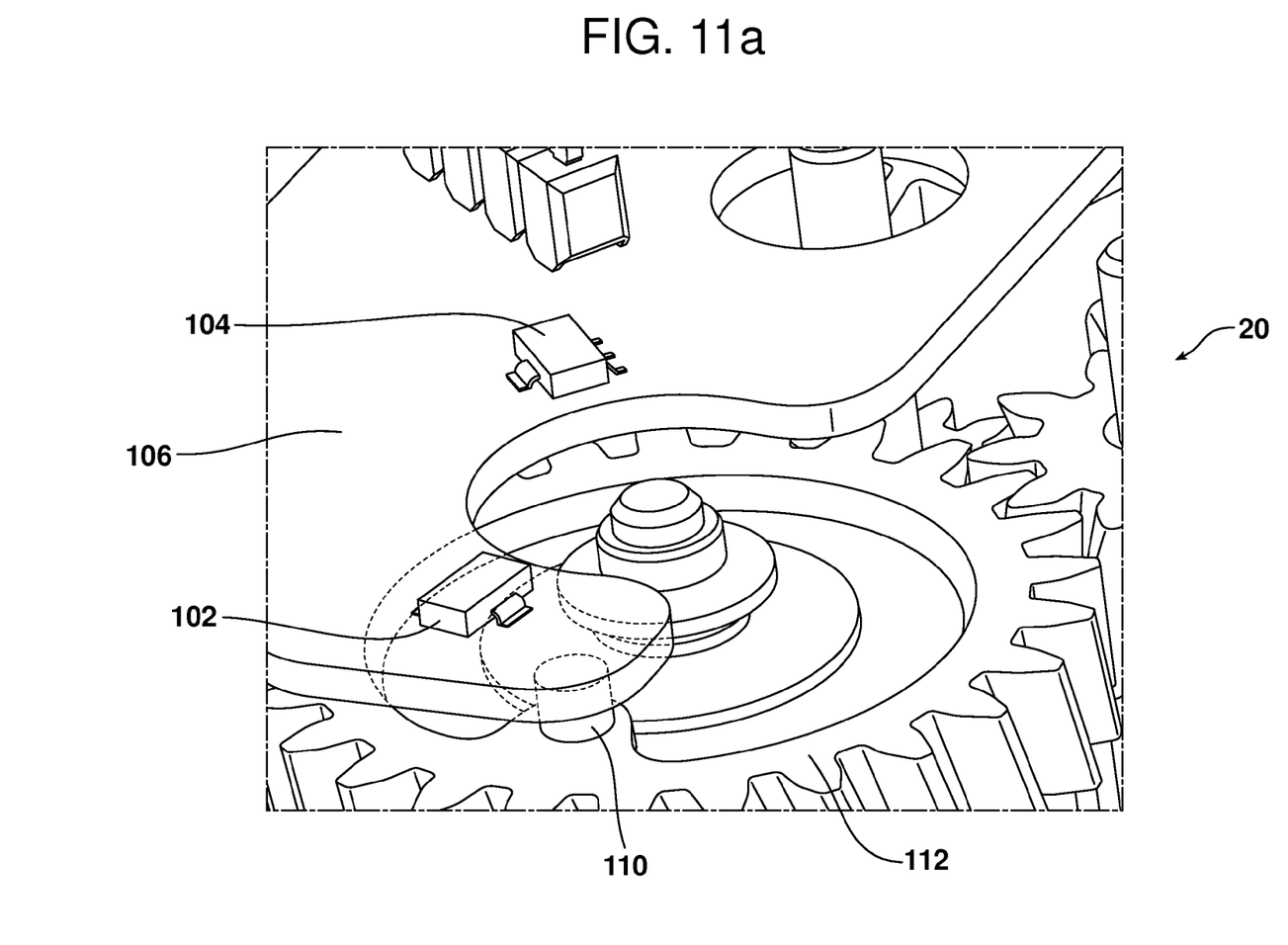
FIGS. 11a-11c illustrate the relative position of the magnet element to the hall sensing elements as the camera is displaced from the fully deployed position to the hidden or home position.

Reference is now made to FIG. 11a which illustrates the position of the magnetic element 110 on the gear 112 with respect to the hall sensing element 102 on the adjacent circuit board 106 when the cover 12 is fully opened and the camera 16 is in the fully deployed position illustrated in FIG. 4. As the camera 16 is displaced from the fully deployed position to the hidden position illustrated in FIG. 3, the drive gear 112 rotates in a clockwise direction (note action arrow C in FIG. 11a) moving the magnet element 110 past the hall sensing element 102 and then on around past the hall sensing element 104 until it reaches the position illustrated in FIG. 11c corresponding to the camera hidden position.

In this operating example, the vehicle operator depresses an actuator 114 which sends a control signal along signal line 116 to the controller 108. The controller 108 then sends a control signal along line 118 to the pulse width modulating drive motor 18 causing that drive motor to displace the camera 16 and associated cover 12 from the deployed/open position illustrated in FIG. 4 and FIG. 11a to the closed or home position illustrated in FIG. 3 and FIG. 11c. The controller 118 monitors/counts the revolutions of the drive motor 18 and compares them to a known value representative of a position in which the cover 12 is only approximately 4 mm from the fascia 120 of the vehicle. At this point, the magnetic element 110 on the gear 112 is in the intermediate position illustrated in FIG. 11b between the hall sensing element 102 and the hall sensing element 104. At that time, the controller slows the operating speed of the drive motor 18 to allow for a soft close as the cover begins to engage the gasket 17 provided around the front opening 19 of the housing 14. This contact occurs at the point when the magnetic element 110 is passing by the hall sensing element 104. Upon sensing the magnetic element 110, a signal is sent from the hall sensing element 104 along signal line 122 to controller 108. In response to that signal, the controller 108 increases the power to the drive motor 18 so that the cover fully compresses and seats against the gasket 17 flush against the fascia 120 as the motor stalls.

Figure 11B:
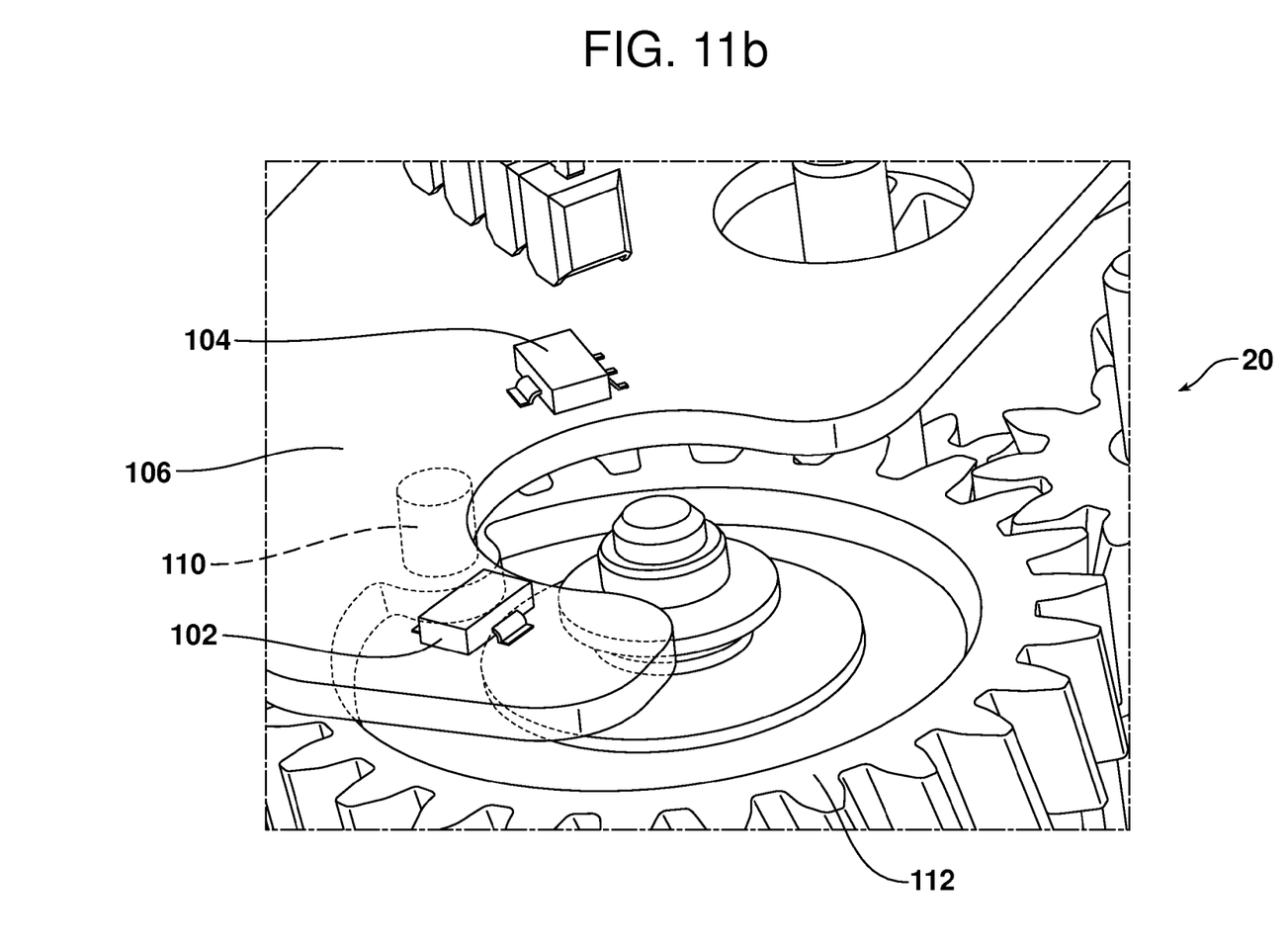

It should be appreciated that as the camera 16 is displaced from the deployed position illustrated in FIGS. 4 and 11a to the intermediate position illustrated in FIG. 11b where there is only a 4 mm gap between the cover 12 and the fascia 120, the controller is operating in obstacle detection mode. Thus, the controller monitors the current draw of the drive motor. Any sharp current increase indicates contact with an obstacle causing the controller to immediately reverse the direction of the drive motor 18 and again open the cover 12 without crushing the contacted obstacle. In contrast, once the cover has reached the intermediate point with a narrow 4 mm wide gap between the cover and the fascia 120, the controller suspends obstacle detection so as to prevent any false return of the cover 12 to the deployed position when the cover contacts the gasket 17.

Figure 11C:
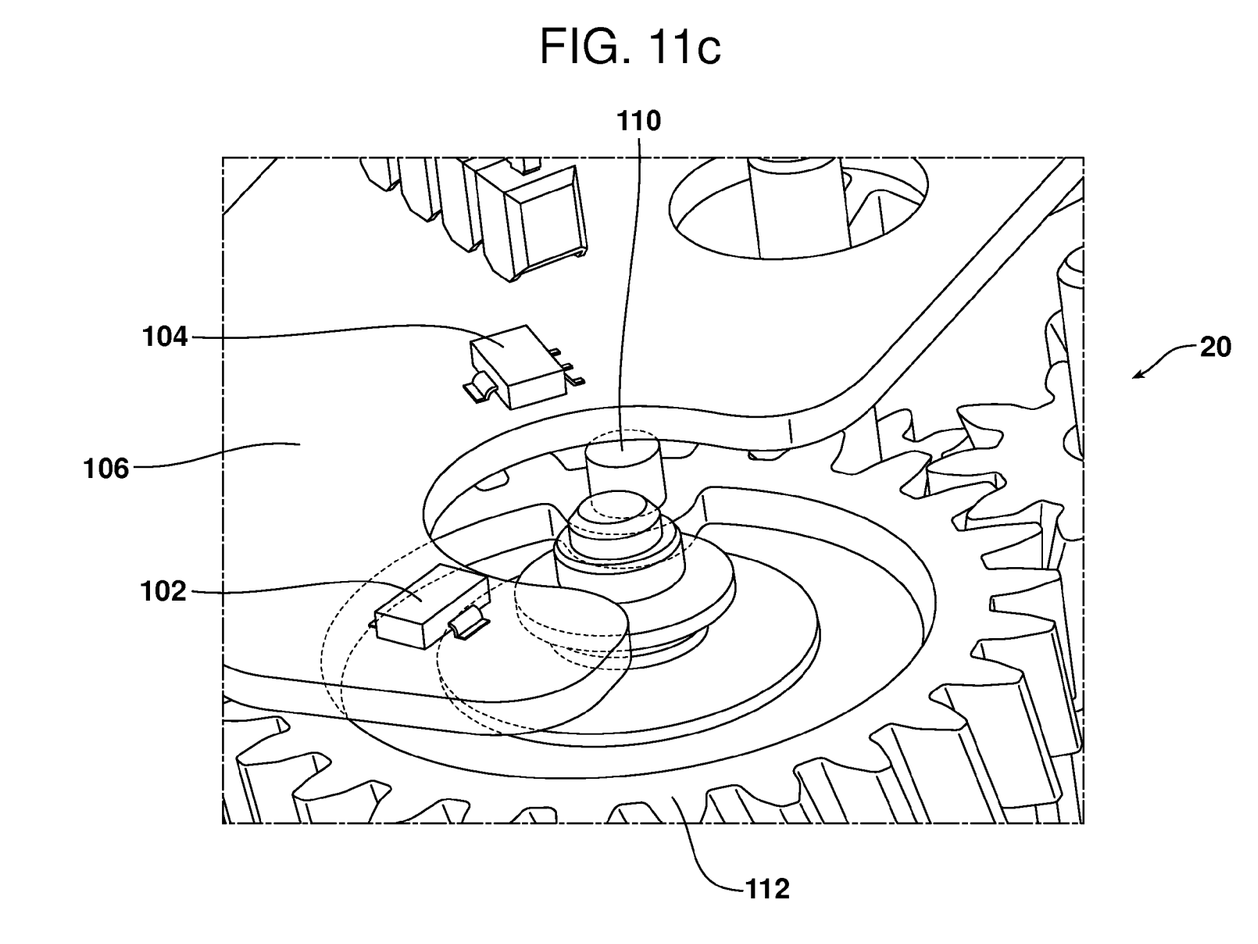

When the camera 16 is displaced from the hidden or home position illustrated in FIG. 3 and FIG. 11c to the fully deployed position illustrated in FIGS. 4 and 11a, the gear 112 rotates in a counterclockwise direction and the magnet element 110 sweeps along an arc past the hall sensing element 104 and then past the hall sensing element 102. Upon receiving a signal from the actuator 114 to deploy the camera 16, the controller 108 sends a control signal along line 118 to the drive motor 18 to begin displacing the camera toward the deployed position. In the event the hall sensing element 104 does not detect the passing of the magnetic element 110 within a predetermined period of time and a temperature sensor 124 indicates a temperature below the freezing point of water to the controller 108, the controller enters a third or ice breaking mode of operation. In this mode, the controller 108 sends a signal directing additional power to the drive motor 18 to help break the cover 12 free from any ice holding the cover in the closed position. If necessary, this increase in power is done for multiple activation cycles until the ice is broken and the cover begins displacement toward the deployed position. As the magnetic element 110 passes the hall sensing element 104, the controller 108 reduces the power to the drive motor 18 so as to drive the cover open at its normal opening speed which is faster than the normal closing speed. Once the magnetic element 110 passes the second hall sensing element 102, that sensing element sends a detection signal along line 126 to the controller 108. In response, the controller increases the power to the drive motor 18 to help ensure that the camera is always fully deployed into the same position against the stop 60 as the motor stalls.

As should be appreciated, the control system 100, through operation the controller 108 and pulse width modulation of the pulse width modulating drive motor 18 allows for full differentiation of the opening and closing speed. More specifically, the camera 12 may be deployed in a first time frame $F_1$ of approximately 700 ms to provide quick boot-up of the system and minimal delay when the operator of the vehicle requests deployment of the camera 12 for purposes of viewing obstacles at the front of the vehicle V. In contrast, in a second mode of operation, the camera is hidden in a second time frame $F_2$ of approximately 1.5 seconds. Thus it should be appreciated that the first time frame $F_1$ is substantially less than the second time frame $F_2$. Advantageously, the slower closing time and speed allows better force increase detection and thus obstacle detection which results in better anti-pinch control. In addition, this allows for a soft close followed by a power bump at full close for better compression of the gasket or seal 17 and a consistent closing position of the cover 12. As noted above, a third mode of operation allows for breaking the cover 12 free of any ice that may be retaining the cover in a closed position when one desires to deploy the camera for operation.

It should also be appreciated that the controller 108 and pulse width modulation drive motor 18 function together to allow consistent speed of operation in the first and second modes even in the event of vehicle voltage variations. This insures proper deployment and return of the cover 12 and camera 16 under substantially any operating conditions.

The foregoing has been presented for purposes of illustration and description. It is not intended to be exhaustive or to limit the camera assembly 10 to the precise form disclosed. For example, in the illustrated embodiment, the control system 100 includes a single position marker/magnetic element 110 and two hall sensing elements 102, 104. It may instead include multiple position markers/magnetic elements 110 or anywhere from 1 to 5 or 6 hall sensing elements if desired for any reason. Further, it should be appreciated that the position marker(s) and sensors may take other forms. These were chosen in the illustrated embodiment as they are more reliable then mechanical switches and there is no mechanical wear. Obvious modifications and variations are possible in light of the above teachings. All such modifications and variations are within the scope of the appended claims when interpreted in accordance with the breadth to which they are fairly, legally and equitably entitled.

What is claimed:

1. A hidden camera assembly for a motor vehicle, comprising:
    a cover;
    a camera;
    a pulse width modulating drive motor;
    a linkage connecting said drive motor to said cover and said camera; and
    a control system to modulate output of said drive motor and electronically monitor displacement of said camera between hidden and deployed positions, wherein said control system includes at least one position marker carried on said linkage, at least one sensor for detecting said at least one position marker, and a temperature sensor, wherein said control system provides a first mode of operation wherein said camera is deployed in a first time frame $F_1$, a second mode of operation wherein said camera is hidden in a second time frame $F_2$ where $F_1<F_2$ and a third mode of operation wherein power to said drive motor is increased for a limited period of time to break said cover free of any ice holding said cover in a closed position, wherein said third mode of operation is entered when the at least one sensor does not detect the passing of the at least one position marker within a predetermined period of time and the temperature sensor indicates a temperature below the freezing point of water.

2. The assembly of claim 1, wherein said control system includes a controller operating said drive motor in response to input data from said at least one sensor.

3. The assembly of claim 2, wherein said at least one position marker is a magnetic element.

4. The assembly of claim 3, wherein said at least one sensor is a hall sensing element.

5. The assembly of claim 4, wherein said controller is a computing device.

6. The assembly of claim 5, wherein said control system includes a circuit board and said at least one hall sensing element and said computing device are carried on said circuit board.

7. The assembly of claim 6, wherein said linkage includes a transmission including at least one gear and said magnetic element is carried on said at least one gear.

8. The assembly of claim 6, wherein said linkage includes a transmission, a crank arm, a first link, a second link, a cover support bracket and a camera mounting bracket.

* * * * *